United States Patent [19]

Hasten et al.

[11] Patent Number: 4,744,729
[45] Date of Patent: May 17, 1988

[54] PRESSURE ACTIVATED PUMP-OFF CONTROL

[75] Inventors: Jerry D. Hasten, Crystal City; James R. Clark, Carrizo Springs, both of Tex.

[73] Assignee: Conoco Inc., Ponca City, Okla.

[21] Appl. No.: 906,122

[22] Filed: Sep. 11, 1986

[51] Int. Cl.$^4$ ............................................... F04B 49/02
[52] U.S. Cl. ........................................ 417/12; 417/18; 417/44
[58] Field of Search .................... 417/12, 18, 20, 43, 417/44, 38; 166/64, 250, 369

[56] References Cited

U.S. PATENT DOCUMENTS

| | | | |
|---|---|---|---|
| 3,559,731 | 2/1971 | Stafford | 417/12 X |
| 3,972,648 | 8/1976 | Sangster | 417/12 |
| 4,507,053 | 3/1985 | Frizzell | 417/12 |
| 4,508,488 | 4/1985 | Pikna | 417/18 X |
| 4,516,911 | 5/1985 | Senghaas et al. | 417/12 X |

Primary Examiner—Leonard E. Smith
Attorney, Agent, or Firm—Richard K. Thomson

[57] ABSTRACT

A pressure-activated pump-off control for intermitting the operation of a low-production well. A pressure sensor and a series of three timers control the operation of the pump to maximize efficiency. A first fill-in timer disables the pump for a first time period during which fluids accumulate in the well. When the fill-in timer times out, both a second pump-up timer and the pump motor are energized. If the pressure sensor determines adequate minimum fluid pressure in the tubing, the pressure switch is opened, the second timer is de-energized, and control of the pump being transferred to a third pump-up timer in conjunction with the pressure sensor. When the pressure falls below the desired minimum, the pressure switch will remain closed and after a predetermined period of time corresponding to a desired number of strokes, the pump-off timer times out, shuts off the pump and re-energizes the fill-in timer for another cycle.

12 Claims, 3 Drawing Sheets

PRESSURE ACTIVATED PUMP-OFF CONTROL

BACKGROUND AND SUMMARY OF THE INVENTION

The present invention is directed to apparatus for controlling the intermittent operation of a low production (less than 50 barrels a day) well. More particularly, the present invention is directed to apparatus for operating the pump on a secondary recovery well intermittently responsive to the well tubing pressure (i.e., to a pressure activated, pump-off control).

Many "vintage" oil wells are of low capacity or production, that is, less than 50 barrels of oil per day. These wells are typically being produced using secondary recovery methods (i.e., they are being produced using artificial lift techniques, pumps) and, in some cases, tertiary recovery methods (i.e., in addition to pumping, gas, steam, water, or chemicals are injected to enhance the amount of oil produced from a given pore volume).

Due to the low production rates of these wells, continuous pump operation may not be possible, even by slowing the pump to its slowest operating speed. Conventional intermitting devices comprise time clocks that will operate a well for, say, 20 minutes every two hours. Such clocks are not entirely satisfactory. While the pumping system is designed to operate with a minimum of supervision, these intermitting clocks must be monitored fairly closely and, as the production of the well is steadily reduced, the clocks need readjustment. Improper adjustment of the time clock can not only result in inefficient operation (e.g., failure to produce all fluid available for under-pumping, wasted energy for over-pumping), it can increase wear and tear on the equipment (due to "pounding fluid") leading to premature failure of one or more components of the system. In the present uncertain market, the added expense associated with a well workover can be a key factor in determining to shut in a low producing well.

The present invention overcomes these difficulties resulting in more efficient, cost-effective operation of the pump. A pressure sensor, in conjunction with a series of three timers, control the operation of the pump. A first timer (one of two timing devices on a dual adjustable timer), known alternatively as the "fill-in" timer and the "off" timer of the repeatable timer $T_R$, disables the operation of the pump for a first period of time during which well fluids accumulate in the tubing (i.e., the well "fills in").

When the fill-in timer "times out" (its set time period elapses), circuit means turn on the pump motor for a second period of time of a duration partly determined by a second timing device on the dual adjustable timer, known alternatively as the "pump-up" timer or the "on" timer of the repeatable timer, $T_R$.

The period of operation of the pump motor is only partially determined by the pump-up timer because if the pressure sensor determines that a particular minimum tubing pressure desired for production is present, then circuit means will switch control of the pump motor from the pump-up timer to the combined control of yet a third timer in conjunction with said pressure sensor, this third timer being known alternatively as the "pump-off" timer or the delay timer $T_D$. If "pressure is made" (minimum tubing pressure achieved), a normally closed pressure switch will be opened on each stroke of the pump in which this minimum pressure is present. Opening of this switch interrupts power to the pump-off timer causing it to be reset (i.e., to start its timing cycle over). As soon as pressure is not made, the pump-off timer times out shutting off the pump motor after a third period of time (selected to correspond with the particular number of pump strokes necessary to achieve a fully pumped-off condition) and circuit means restores control to the fill-in timer for another cycle. Should pressure not be met within the second time period, the pump-up timer times out and the circuit means restores control to the fill-in timer again, initiating another cycle. The present pressure-activated pump-off control improves pump efficiency, reducing non-productive pump operation, and lifting all fluid that has accumulated. Wear on the mechanical components associated with fluid pounding is reduced as is the possibility of gas locks.

Various other features, characteristics, and advantages of the present invention will become apparent after a reading of the following specification.

DETAILED DESCRIPTION OF THE PREFERRED EMBODIMENTS

Figure 1:
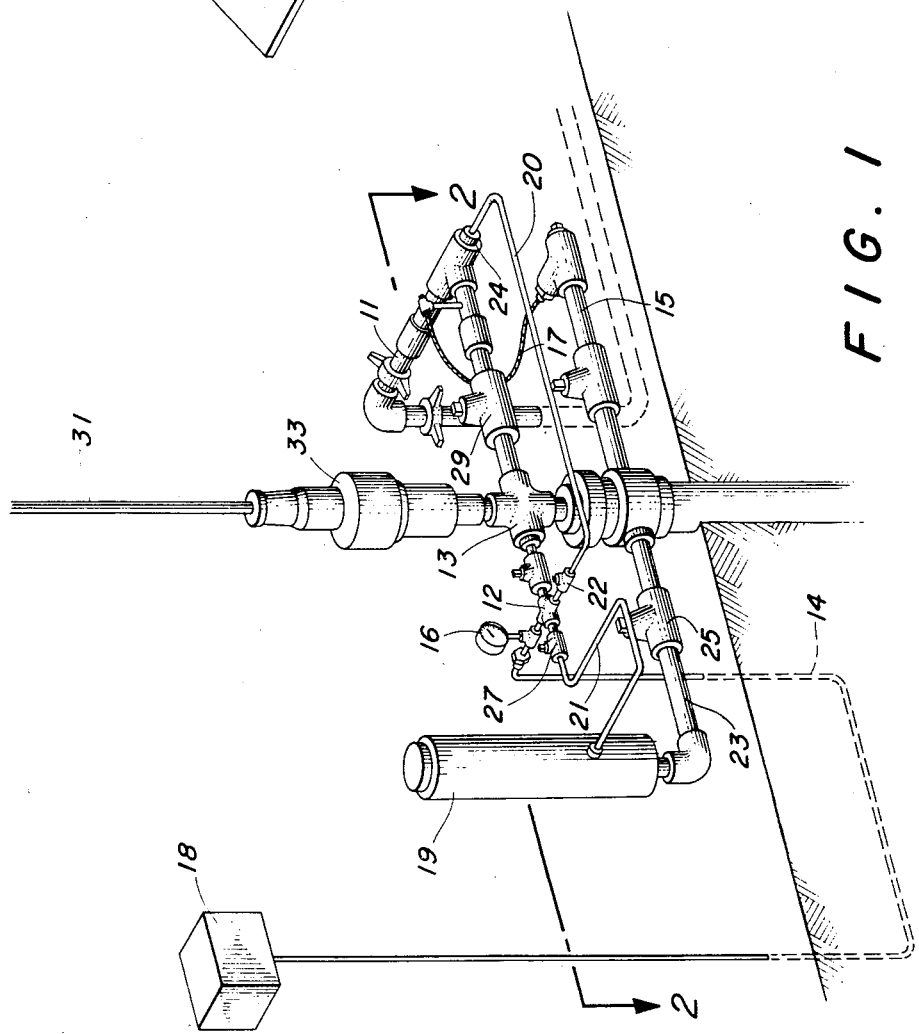
FIG. 1 is a side elevation of a wellhead incorporating the principles of the present invention.

A wellhead modified with the features of the present invention is shown in FIG. 1, generally at 10. The normal production line 11 emanates from pumping tee 13 conducting the well production (fluid and gas) to a processing tank (not shown) via an underground pipeline. A parallel line 15 separately vents natural gas pressure from the well casing and ties it back into the production line 11 via flexible tubing 17. Chemical pot 19 is interconnected to the other side of pumping tee 13 via an input line 21 and a return line 23 (closed loop) to enable chemicals or other treating fluids to be circulated down hole. Valves 25 and 27 close off the flow of fluids to the chemical pot 19 during normal production.

Figure 2:
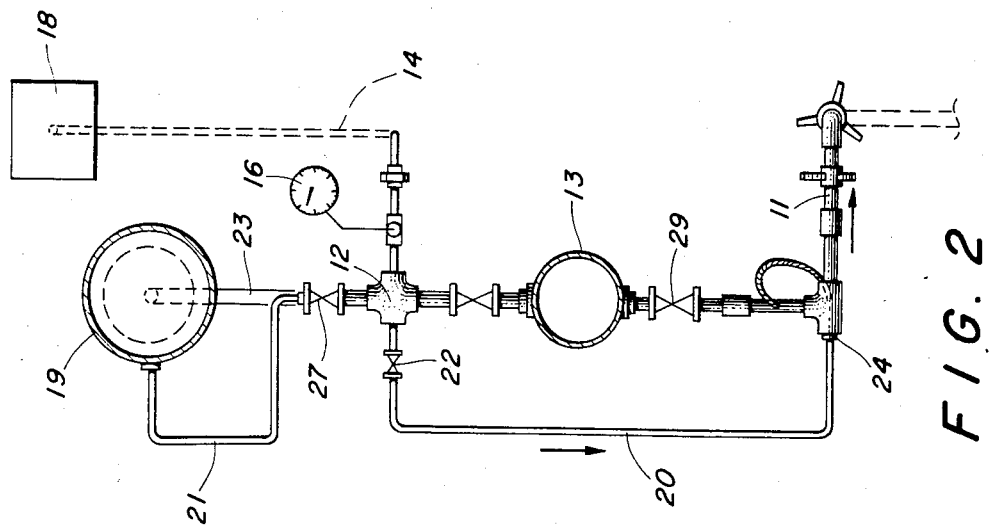
FIG. 2 is a cross-sectional top view as seen along line 2—2 of FIG. 1.

This conventional wellhead equipment has been modified by the insertion of a 4-way cross tee 12 into chemical input line 21. Shut-off valve 29 in the flow line 11 is closed directing the entire well production through cross tee 12. As best seen in FIG. 2, one of the spare arms of tee 12 has line 14 connecting it through gage 16 to pressure sensor 18. The line 14 is connected to sensor 18 through a dead-end connection, i.e., there is no flow to the sensor but line 14 serves to connect sensor 18 to the tubing pressure in the production tubing (not shown).

By way of example and not restriction, a suitable pressure sensor is ITT Neo-Dyn Model No. 100P12C3, sold as "Adjustable Pressure Switch". This sensor 18 can be adjusted to detect a predetermined minimum tubing pressure that is desired to initiate sustained pump operation. It may, for example, be set at about 60 psi.

Since line 14 has a dead-end connection and valve 27 closes off flow to the chemical pot 19, all production resulting from the action of the pump (not shown) as reflected in the piston-like movement of polished rod 31 in stuffing box 33 is directed through flow line 20 connected to the fourth arm of cross tee 12. There is preferably an adjustable ball valve 22 inserted in line 20 adjusted to control line pressure and flow rate. It is preferred that ball valve 22 be adjusted to permit a line pressure 10–20 psi above the maximum tubing pressure (e.g., 60 psi). Flow line 20 transmits the produced fluids back to flow line 11 through adaptor 24.

Figure 4:
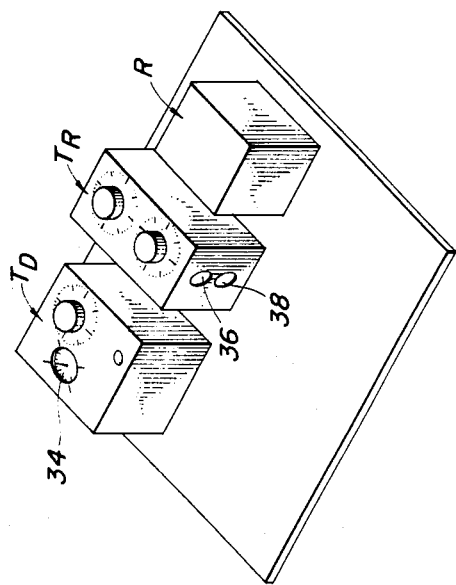
FIG. 4 is an isometric side view of the electrical board showing the timers and relay used in conjunction with the present invention.
Figure 3:
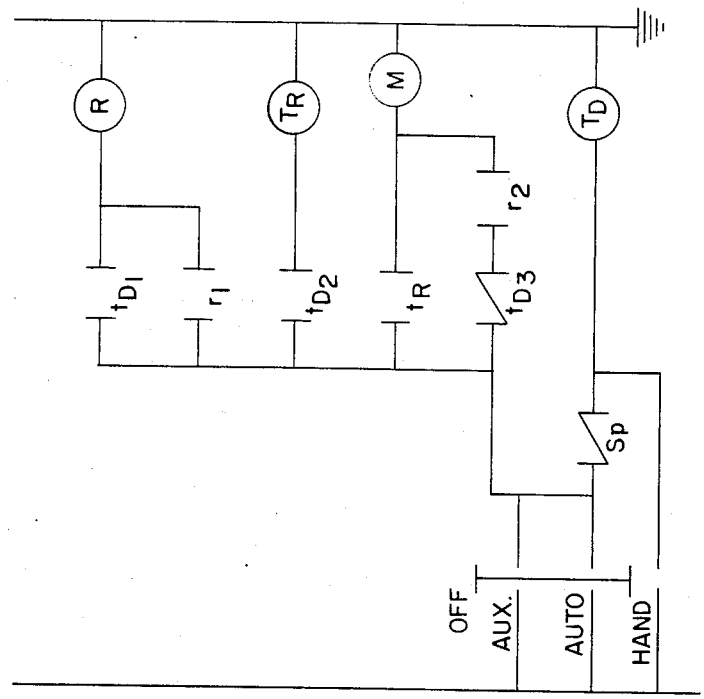
FIG. 3 is an electrical schematic diagram of the circuit used in the present invention.

The electrical circuitry used to operate the pressure actuated pump-off control of the present invention is shown in FIG. 3 while the timers and relay used in this circuit are shown in FIG. 4. (Note, for the sake of simplicity, the wiring interconnecting the various components has not been shown in the Figure).

There are three timers associated with the circuit. These timers are:
1. A delay (or "pump-off") timer $T_D$
2. A dual resettable timer $T_R$ has two adjustable timing devices:
   (i) $T_R$'s "off" (or "fill-in") timer, and
   (ii) $T_R$'s "on" (or "pump-up") timer.

By way of example, suitable timers are available from Syrelec Corp. bearing model no. PAR 2B 110 VAC for the delay timer and model no. ODR HH 110 VAC for the dual resettable timer. A relay R is inserted in the circuit, principally to avoid spikes in power usage when power is restored following a power outage. (Utility rates are affected by peak usage for high volume consumers and the result of all the pumps on a particular lease being simultaneously restarted can produce on artificially high spike). Each timer can be adjusted for any period between 15 seconds and 10 hours and 40 minutes. The increment of time is adjusted by setting dial 34 of delay timer $T_D$ and dials 36 and 38 of resetable timer $T_R$. These three broad ranges of times in conjunction with the capability to adjust pressure desired over a considerable range, gives this system virtually limitless flexibility.

As seen in FIG. 3, normally closed pressure switch $S_p$ is connected in series with delay timer $T_D$. Three switches $t_{D1}$, $t_{D2}$ and $t_{D3}$ which are actuated by timer $T_D$ are connected in series with relay R, repeatable timer $T_R$ and a switch $r_2$ (actuated by relay R), respectively. Switches $t_{D1}$ and $t_{D2}$ are normally open while $t_{D3}$ is a normally closed switch. A switch $t_R$ that is tripped by the "on" timer of the repeatable timer $T_R$ is connected in series with the motor M of the pump (not shown). A second switch tripped by relay R ($r_1$) is connected in parallel with switch $t_{D1}$ and serves to latch the relay after it is initially energized. Switch $t_R$ and switches $t_{D3}$ and $r_2$ form redundant power paths to pump motor M.

Figure 5:
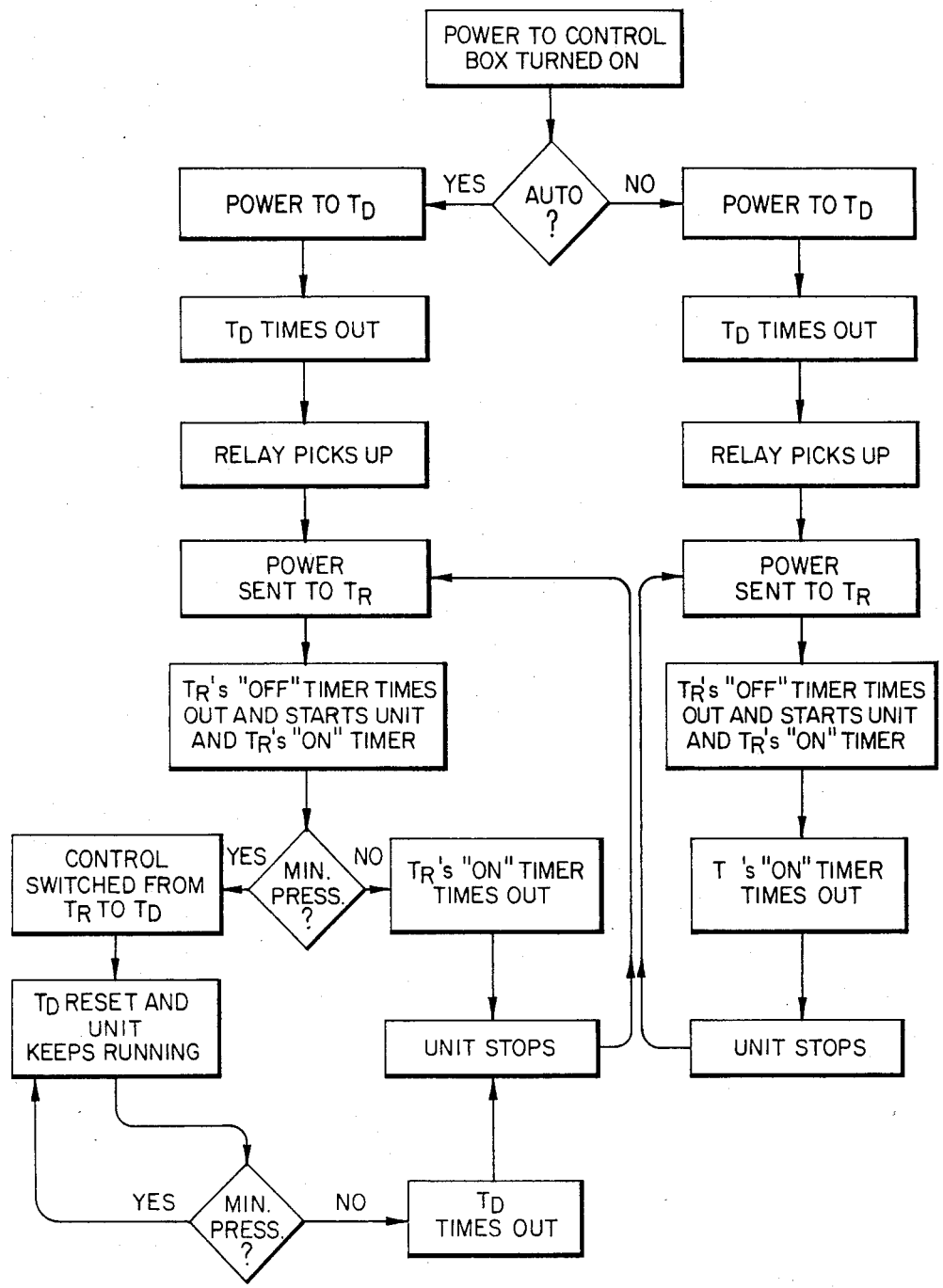
FIG. 5 is a flow chart indicating the steps involved in the operation of the present invention.

Operation of the circuit can best be understood by referring to FIGS. 3 and 5. When the control box power is turned on, if the selector is in the "auto" position, the sequence of events in the left hand column of FIG. 5 will occur. Since pressure switch $S_p$ is normally closed, power is sent to delay timer $T_D$. Since each of the power paths to motor M has an open switch, the pump is not energized. When timer $T_D$ times out, switches $t_{D1}$ and $t_{D2}$ are closed energizing the relay R and resettable timer's ($T_R$'s) "off" timer and opening switch $t_{D3}$.

As relay R is energized, it trips switch $r_1$ latching the relay in the "on" position (the relay will hold switches $r_1$ and $r_2$ closed so long as there is power to the relay) and closing switch $r_2$. The "off" or "fill-in" timer of $T_R$ times out closing switch $t_R$ which turns on the pump and energized the "on" ("pump-up") timer of $T_R$. The pump will operate for the time period set on the pump-up timer unless the well makes pressure. If pressure sensor 18 senses the minimum desired pressure in the well tubing, switch $S_p$ is opened which restores switches $t_{D1}$, $t_{D2}$ and $t_{D3}$ to their normal positions. Latching switch $r_1$ prevents the relay from being de-energized but power to resettable timer $T_R$ is disconnected which in turn, opens the redundant path (upper path in FIG. 3) to motor M. The pump continues to operate, however, since switches $t_{D3}$ and $r_2$ are both now closed.

When the supply of well fluids becomes depleted switch $S_p$ will remain closed and delay timer $T_D$ will time out (after, say, two strokes) re-opening switch $t_{D3}$ shutting off pump motor M and close switch $t_{D2}$ restarting $T_R$'s off timer. If the well fails to make pressure within the time allotted, then $T_R$'s on timer times out opening switch $t_R$ which shuts off the pump and $T_R$'s off timer is again re-energized.

The control panel can be set to the "Hand" position to enable the maintenance engineer to test out the operation of both the electrical (minus the pressure sensor) and mechanical components of the system. With this setting, the pump merely cycles off and on under the control of the two timing devices of the resettable timer $T_R$, in the manner of a conventional time clock-controlled well. A separate switch (not shown) enables the maintenance engineer to bypass the electronic timers and energize the pump directly to enable him/her to test the mechanical portion of the system (e.g., following an adjustment or the like) or to pump chemicals downhole without waiting for the timers to operate the pump motor.

It will be further understood that a high-pressure sensor, which is not shown and which forms no part of the present invention, will be employed in the system. This high-pressure sensor shuts down the pump in the event that a line blockage, as might be caused by a paraffin buildup or the like, causes the line pressure to reach or exceed design limits. It will be apparent that the function of the high-pressure sensor might be performed by the pressure sensor 18 with a slight modification of the system.

Various other changes, alternatives and modifications will become apparent to a person of ordinary skill in the art following a reading of the foregoing specification. It is intended that all such changes, alternatives and modifications as come within the scope of the appended claims be considered part of the present invention.

Having thus described our invention, we claim:

1. A method for intermittently operating a pump of a well which produces less than 50 barrels of oil per day, said method comprising:
   disabling the pump for a first period of time during which well fluids may accumulate in the well, said first time period being determined by a first timer;
   upon expiration of said first time period, closing a first circuit path thereby turning on said pump for a second period of time, said second time period being determined by a second timer;
   sensing the pressure of the fluids built up in the well, opening a second circuit path responsive to sensing a desired minimum pressure in said well;
   shutting off said pump either after the elapsing of said second time period if said minimum pressure is not sensed, or after a third time period determined by a third timer if said minimum pressure is sensed.

2. Apparatus including several functional elements for controlling the intermittent operation of a low producing well comprising:
- an adjustable "fill-in" timer that permits production fluids to accumulate in the well for a first predetermined period of time so that they may be produced;
- a "pump-up" timer that operates the well to produce said production fluids for a second predetermined interval of time unless the production fluids reach a predetermined minimum pressure;
- a "pump-off" timer that shuts off the operation of said well within a third predetermined period of time if said minimum pressure is not met;
- a pressure sensor to detect well tubing pressure and determine if said predetermined minimum pressure is present;
- a pressure switch that is normally closed but which is momentarily open each time said minimum pressure is present, the opening of said pressure switch being operative to reset said pump-off timer and keep said well producing;
- circuit means operatively interconnecting said several functional elements with said pump and serving to transfer control of said well from (a) said pump-up timer to (b) said pump-off timer and said pressure switch, the first time in each cycle that said minimum pressure is present.

3. In a device for pumping fluids from a well using a motorized pump, apparatus operating said pump on an intermittent basis, said apparatus comprising:
- a first circuit loop including an adjustable pressure sensor switch and a first timer coupled in parallel with said pump motor, said adjustable sensor switch comprising a generally closed switch adapted to detect a minimum desired tubing pressure for operating said pump and to momentarily open during each pump cycle when said minimum pressure is detected, said first timer being operable to turn off said pump after a first predetermined time period, said first timer being restarted each time said pressure sensor switch momentarily opens;
- a second circuit loop including a second timer connected in parallel to said pump and operable to turn off said pump after a second predetermined time period if said pressure sensor fails to detect said minimum desired pressure;
- circuit means to switch control of said pump motor between said second timer and said first timer with said pressure sensor switch.

4. The pumping device of claim 3 wherein said circuit means comprises switch means in series with said pump that is responsive to said first and second timers.

5. The pumping device of claim 4 wherein said switch means comprises a first switch responsive to said first timer and a second switch responsive to said second timer.

6. The pump device of claim 5 wherein said first and second switches are connected in series with said pump through separate circuit loops.

7. The pumping device of claim 3 further comprising a third timer operable to disable the pump for a third predetermined period of time during which said well may fill with fluid.

8. The pumping device of claim 7 wherein said second and third timers comprise portions of a dual adjustable timing device.

9. The pumping device of claim 8 further comprising auxiliary circuit means by-passing said pressure sensor switch to enable said pump to be cycled by said dual adjustable timer.

10. The pumping device of claim 3 further comprising a relay that is powered up when said first timer times out the first time the circuit is energized.

11. The pumping device of claim 10 wherein said relay comprises means to maintain at least two switches of the circuit in closed condition.

12. The pumping device of claim 10 further comprising means for latching said relay to keep it energized for so long as power is maintained to said circuit.

* * * * *